(12) United States Patent
Downing

(10) Patent No.: US 10,999,457 B2
(45) Date of Patent: May 4, 2021

(54) STAPLING SENSORS TO INDICATE MOVEMENT OF A STAPLING DEVICE

(71) Applicant: Hewlett-Packard Development Company, L.P., Spring, TX (US)

(72) Inventor: Elliott Downing, Vancouver, WA (US)

(73) Assignee: Hewlett-Packard Development Company, L.P., Spring, TX (US)

(\*) Notice: Subject to any disclaimer, the term of this patent is extended or adjusted under 35 U.S.C. 154(b) by 0 days.

(21) Appl. No.: 16/643,294

(22) PCT Filed: Sep. 7, 2017

(86) PCT No.: PCT/US2017/050499
§ 371 (c)(1),
(2) Date: Feb. 28, 2020

(87) PCT Pub. No.: WO2019/050524
PCT Pub. Date: Mar. 14, 2019

(65) Prior Publication Data
US 2020/0351413 A1  Nov. 5, 2020

(51) Int. Cl.
*G06F 3/12* (2006.01)
*H04N 1/00* (2006.01)

(52) U.S. Cl.
CPC ..... *H04N 1/00639* (2013.01); *H04N 1/00588* (2013.01); *H04N 1/00737* (2013.01); *H04N 1/00748* (2013.01)

(58) Field of Classification Search
None
See application file for complete search history.

(56) References Cited

U.S. PATENT DOCUMENTS

| 5,842,624 | A | 12/1998 | Ishida | |
| 5,895,036 | A * | 4/1999 | Asao | B42C 1/12 |
| | | | | 270/58.09 |
| 6,578,838 | B2 | 6/2003 | Trovinger et al. | |
| 8,387,965 | B2 | 3/2013 | Borsuk et al. | |
| 10,538,406 | B2 * | 1/2020 | Ohta | G03G 15/6541 |
| 2010/0117288 | A1 * | 5/2010 | Taki | B65H 37/04 |
| | | | | 270/58.08 |
| 2015/0014913 | A1 * | 1/2015 | Obuchi | G03G 15/6544 |
| | | | | 270/58.12 |

(Continued)

FOREIGN PATENT DOCUMENTS

EP  3037883 A1  6/2016

OTHER PUBLICATIONS

Finisher Maintenance Manual, Jul. 2005, http://rfg-esource.ricoh-usa.com/—182 pages.

*Primary Examiner* — Henok Shiferaw
(74) *Attorney, Agent, or Firm* — Brooks Cameron & Huebsch PLLP

(57) ABSTRACT

A system may include a finishing device to receive a print job. The print job may move about a first axis of the finishing device. The system may further include a stapling device contained within the finishing device. The stapling device to move about a second axis of the finishing device, and the second axis may be perpendicular to the first axis. A sensor may be located on the stapling device to identify a first edge of the print job. The first edge of the print job may be a leading edge of the print job as the print job moves about the first axis.

15 Claims, 4 Drawing Sheets

(56) References Cited

U.S. PATENT DOCUMENTS

| | | | |
|---|---|---|---|
| 2015/0023765 A1* | 1/2015 | Hongu | B65H 31/38 412/33 |
| 2015/0102085 A1 | 4/2015 | Balili et al. | |
| 2016/0144525 A1* | 5/2016 | Kenmotsu | B26D 5/28 83/74 |
| 2016/0176671 A1 | 6/2016 | Balili et al. | |
| 2016/0191735 A1* | 6/2016 | Mutsuno | H04N 1/00689 358/1.14 |
| 2018/0143578 A1* | 5/2018 | Ishii | G03G 15/6544 |
| 2018/0162678 A1* | 6/2018 | Nakano | B26D 7/18 |

* cited by examiner

STAPLING SENSORS TO INDICATE MOVEMENT OF A STAPLING DEVICE

BACKGROUND

A finishing device, such as a printer, may include a stapling device. In some examples, the stapling device may be fixed, and the finishing device may place a staple in a received print job by moving the print job relative to the stapler to a predetermined position. In some examples, the stapling device may be movable, and the finishing device may place a stapling in the print job by moving the stapling device.

DETAILED DESCRIPTION

Figure 1:
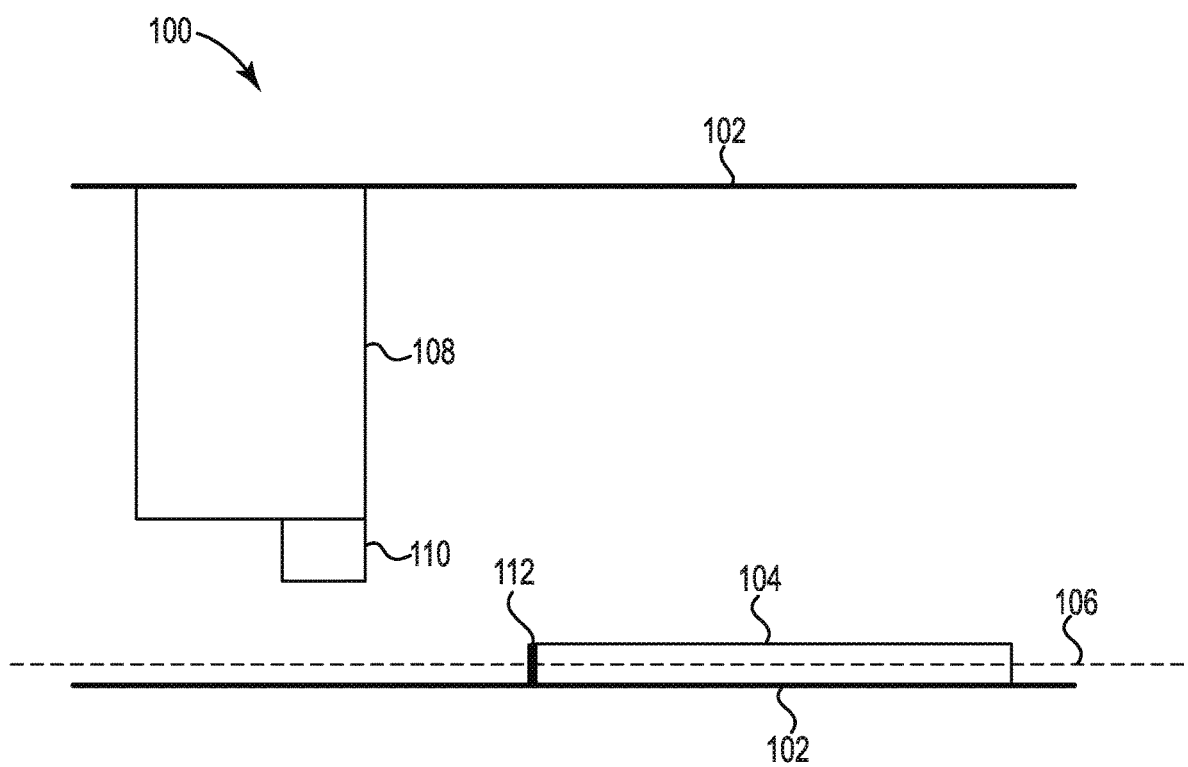
FIG. 1 is an example system for stapling sensors consistent with the present disclosure.

Finishing devices, such as printers, may allow text and/or images to be printed onto a surface, such as paper, from a computing device. A finishing device may include a stapling device. As used herein, a stapling device refers to a device to receive a plurality of printed pages and join the pages together using a fastener, such as a staple. Having a stapling device located on a finishing device may allow a complete finishing of a print job. For example, a stapling device located on a finishing device may remove an additional step of fastening loose pages of a print job together upon completion of the print job.

In some examples, the stapling device may be fixed. That is, the stapling device may not move with respect to the finishing device and/or the print job. In a finishing device with a fixed stapler, the print job may be moved by the finishing device to a particular position. That is, a print job that is to be stapled may be moved into position to be stapled by the finishing device. Once the print job has been moved into position by the finishing device, the stapling device may fasten the print job.

In some examples, the stapling device may be moveable, that is, the stapling device may move with respect to the finishing device and/or the print job. Upon receipt of a print job, a moveable stapling device may be moved to a particular position by a motor. The particular position may be predetermined, such that the motor may automatically move the stapling device into position. As used herein, automatically means with limited or no user input and/or with limited or no prompting. Once the stapling device is moved into position, the stapling device may fasten the print job.

Both a fixed stapling device and a moveable stapling device may include a sensor located on the stapling device. As used herein, a sensor refers to a device that detects an input from the environment. In some examples, the sensor may further respond to the input and/or cause a device to which the sensor is coupled to respond to the input. A sensor may be an optical sensor, which may use light to detect an input. In some examples, an optical sensor may detect an input by determining that a beam of light has been broken. A sensor may also be a physical sensor, such as a lever or switch, although examples are not so limited. A physical sensor may detect an input by determining that the sensor has moved in some manner. For example, a physical sensor with a lever may determine that an input has occurred when the lever pivots with respect to the sensor, although examples are not so limited.

A stapling device that includes a sensor may use the sensor to determine that a print job received by a finishing device has reached the stapling device. For example, a print job may move along a finishing device along an axis such that the print job approaches the stapling device. When the print job reaches the stapler, an edge of the print job may "trip", or provide an input, to the sensor. This may alert the system that the print job has reached the stapling device. In response, the finishing device may move the print job a short, predefined distance past the location at which the sensor was tripped to move the print job into position to receive a staple. The finishing device may further move the print job along a second axis, in the case of a fixed stapling device, to a final fixing position. In the case of a moveable stapling device, the finishing device may move the stapling device along a second axis a predetermined amount, to the final fixing position.

Both fixed stapling devices and moveable stapling devices may use motors to move the print job and/or the stapling device into position. However, the use of a motor may introduce mechanical variations. For example, a motor may include an amount of tolerance in its movements, such that a movement of a particular distance may be greater or lesser than the particular distance. For instance, a motor may include variance such that a movement of a particular amount may not be precise. For example, a motor may have a tolerance of 0.5 mm; thus, when the motor moves something a distance of 2.0 mm, the motor may actually move the item up to 2.5 mm or as little as 1.5 mm.

Moreover, a system that uses a set of predetermined positions to determine where to place a staple may lack visibility as to where the print job is actually located with respect to the stapling device. That is, while a first edge of the print job may be detected at a sensor located on the stapling device, a second edge (e.g. the edge that is perpendicular to the first edge) may not be detected. Instead, as described previously, the print job or the stapling device may move in response to detection of the first edge of the print job. However, if the print job is not in an expected position, the stapling device may not place the staple in the correct position on the print job.

Stapling sensors according to the present disclosure, by contrast, may use a sensor on the stapling device to determine a location of a second edge of a print job. A print job may move within a finishing device along a first axis, such that the print job approaches a stapling device on which may be located a sensor. The print job may trip or trigger the sensor on the stapling device when a first edge of the print job reaches the sensor. Upon tripping of the sensor by the first edge of the print job, the stapling device may move along a second axis, and may continue to move until the sensor is "re-tripped", or re-triggered. This may allow for a precise location of the edges of the print job, such that a staple may be able to be placed in the print job at a precise location. In some examples, the precise location may be a location relative to a corner of the print job.

FIG. 1 is an example system 100 for stapling sensors consistent with the present disclosure. System 100 may include a finishing device 102. As described previously, finishing device 102 may be a printer, although examples are not so limited. Finishing device may receive a print job 104.

As used herein, a print job refers to a number of pages to be printed by a finishing device, such as finishing device 102. In some examples, a print job may be a single page. Print job 104 may originate externally to the finishing device 102, such as on a computing device (not shown in FIG. 1).

Print job 104 may move about a first axis 106 of the finishing device 102. The first axis 106 may correspond to an x-axis, although examples are not so limited. That is, print job 104 may move about a first axis 106 of the finishing device in a direction that is substantially parallel to a lower edge of the finishing device 102. As used herein, "substantially" refers to a characteristic that is close enough to the absolute characteristic to achieve the same functionality. In some examples, the first axis 106 may correspond to a direction of movement towards a stapling device, such as stapling device 108.

Stapling device 108 may be contained within finishing device 102. For example, stapling device 108 may be integrated with finishing device 102. As described previously, stapling device 108 may receive a plurality of printed pages, such as print job 106. Stapling device 108 may further move about a second axis of the finishing device (not shown in FIG. 1). Stapling device 108 will be discussed further with respect to FIG. 2.

Stapling device 108 may include a sensor 110. As described previously, sensor 110 may be an optical sensor or a physical sensor, although examples are not so limited. Sensor 110 may remain fixed as print job 104 moves along axis 106. That is, sensor 110 may not move as print job 104 moves along axis 106 towards sensor 110.

As described previously, a sensor such as sensor 110 may receive an input from the environment. Sensor 110 may receive an input to identify a first edge 112 of print job 104. For example, sensor 110 may receive an input in the form of a first edge 112 of print job 104. As used herein, the first edge of the print job refers to a leading edge of the print job. Thus, first edge 112 of print job 104 corresponds to a leading edge of print job 104 as the print job 104 moves about the first axis 106.

In some examples, the first edge 112 of print job 104 may break a light beam when sensor 110 is an optical sensor, thus signaling that print job 104 has arrived at sensor 110. In other examples, where sensor 110 is a physical sensor, the first edge 112 of print job 104 may move a movable portion of sensor 110, such as a lever or flag. In such examples, the movement of the movable portion of sensor 110 may indicate that the first edge 112 of print job 104 has reached sensor 110.

Figure 2:
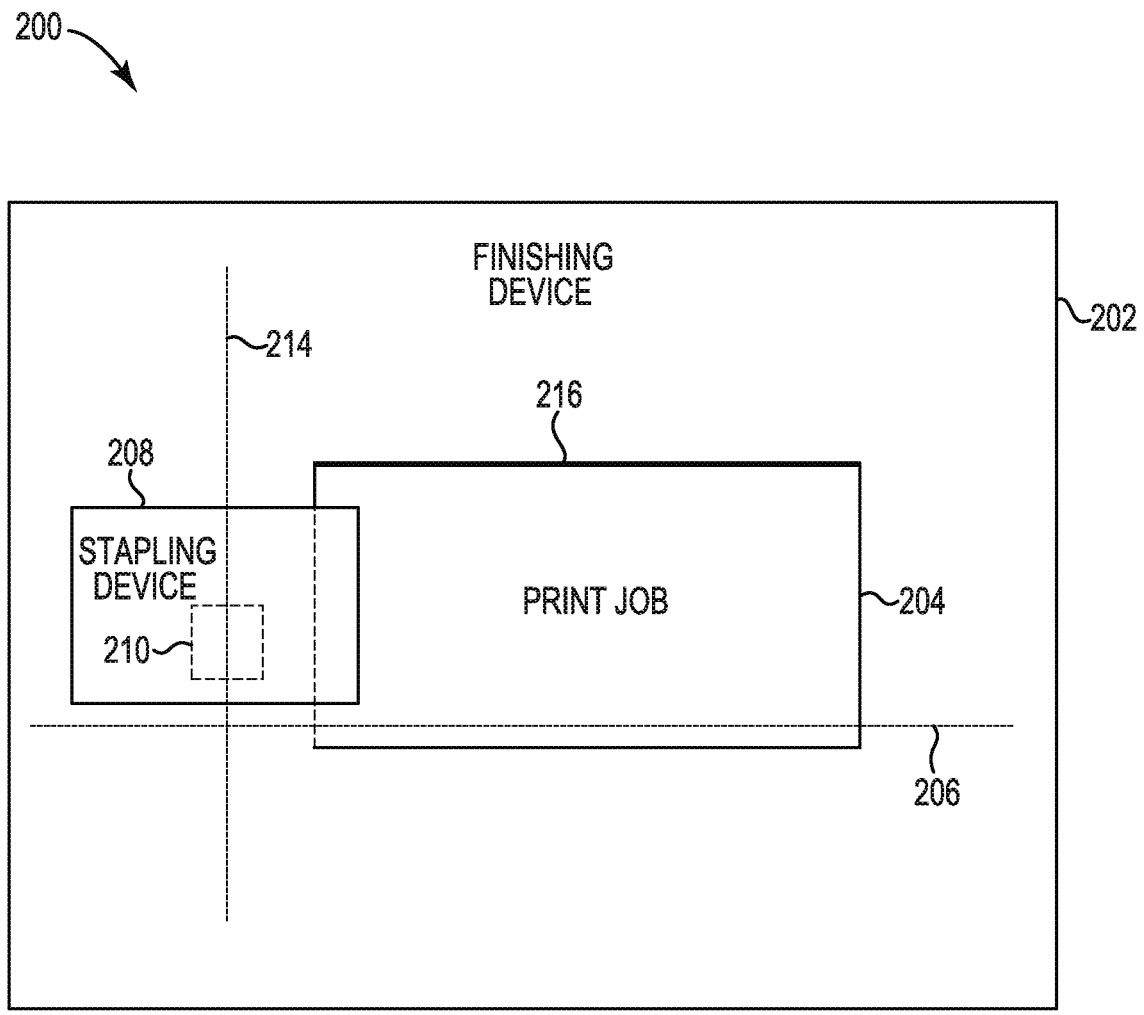
FIG. 2 is another example system for stapling sensors consistent with the present disclosure.

FIG. 2 is another example system 200 for stapling sensors consistent with the present disclosure. System 200 may include a finishing device 202. Finishing device 202 may be akin to finishing device 102, discussed with respect to FIG. 1. System 200 may further include a print job 204. Print job 204 may be akin to print job 104, discussed with respect to FIG. 1. Print job 204 may move about a first axis 206 with respect to finishing device 202. As described with respect to FIG. 1, the first axis may be parallel to the finishing device, such that print job 204 may move about first axis 206 in a direction parallel to finishing device 202. System 214 may further include a stapling device 208. Stapling device 208 may be akin to stapling device 108, described with respect to FIG. 1. As described previously, stapling device 208 may be contained within finishing device 202.

Stapling device 208 may move about a second axis 214 of the finishing device 202. That is, stapling device 208 may move along an axis different than the first axis 206. In some examples, second axis 214 may be perpendicular to first axis 206. In some examples, stapling device 208 may move about the second axis 214 to a predefined position with respect to the print job 204. Said differently, stapling device 208 may move about second axis 214 to a location with respect to print job 204. In some examples, the predefined position with respect to the print job 204 may be a position that is short of a second edge of the print job 204.

Stapling device 208 may include a sensor 210. Sensor 210 may be akin to 110, described with respect to FIG. 1. As described with respect to FIG. 1, print job 204 may move about first axis 206 towards stapling device 208 and sensor 210. As described with respect to FIG. 1, print job 204 may trigger sensor 210 by having a first edge of print job 204 interact with, or trip, sensor 210.

Upon detection of a first edge of print job 204 interacting with, or tripping, sensor 210, stapling device 208 may begin to move about second axis 214. As described previously, second axis 214 may be perpendicular to first axis 206. Stapling device 208 may move about second axis 214 in response to the detection of the print job 204 interacting with sensor 210. That is, stapling device 208 may begin moving about second axis 214 after print job 204 interacts with sensor 210.

In some examples, stapling device 208 may move about the second axis 214 past the predetermined position. That is, stapling device 208 may move beyond the original predetermined position to which stapling device 208 was moved. Stapling device 208 may move about second axis 214 to a point at which the sensor 210 is re-tripped. As used herein, to re-trip a sensor refers to an undoing or removal of the condition that originally triggered the sensor. For example, in the case of an optical sensor, the sensor may be re-tripped when the object causing the light of the sensor to be blocked is removed, while in the case of a physical sensor, the sensor may be re-tripped when the physical portion of the sensor such as the lever is able to move to its original position (e.g., the position the physical portion was in before being tripped).

In some examples, sensor 210 may be re-tripped by a second edge 216 of print job 204. Second edge 216 of print job 204 may be substantially perpendicular to a first edge of the print job 204, such as first edge 112, discussed with respect to FIG. 1. When the sensor 210 is re-tripped by a second edge 216 of the print job 204, the finishing device 202 may have located a second edge of the print job 204. As the second edge 216 of print job 204 may be substantially perpendicular to the first edge of print job 204, sensor 210 may identify a corner of print job 204. That is, the identification of the second edge 216 of print job 204 by the sensor 210, when combined with the identification of the first edge of print job 204 discussed in FIG. 1, may lead to identification of a corner of print job 204.

In some examples, stapling device 208 may not move about the second axis 214; rather, print job 204 may move about the second axis 214. Said differently, print job 204 may move along the first axis as described with respect to FIG. 1, and then may move about the second axis 214. In such examples, print job 204 may move along the second axis 214 until sensor 210 is re-tripped by the second edge of print job 204. In other examples, print job 204 may not move along the first axis; instead, stapling device 208 may move along the first axis and then move along second axis 214. In such examples, stapling device 208 may move along the first axis until the sensor 210 is tripped by, for instance, a first edge of print job 204, as described with respect to FIG. 1. Stapling device 208 may then move along the second axis 214 as described previously.

Figure 3:
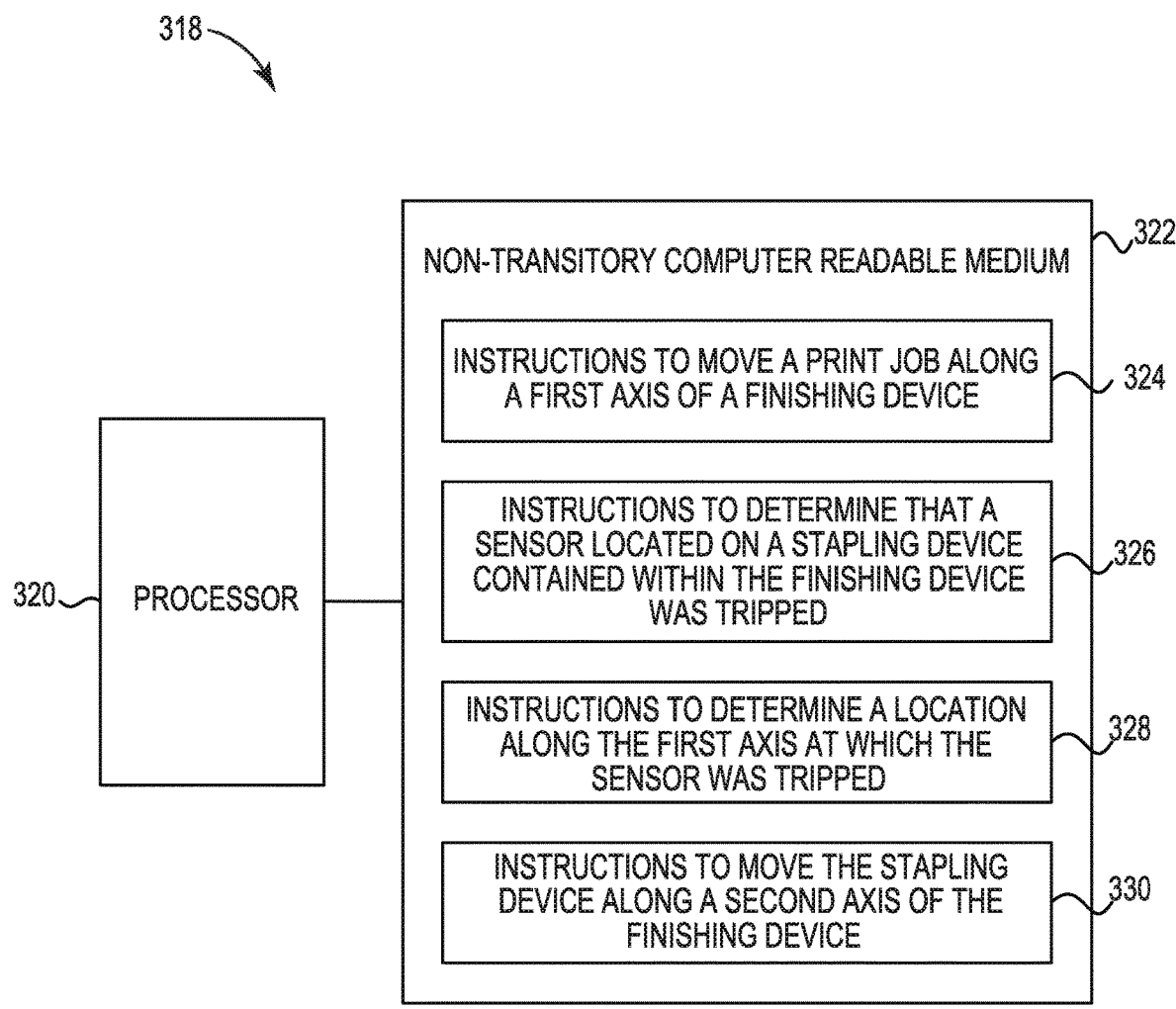
FIG. 3 is another example system for stapling sensors consistent with the present disclosure.

FIG. 3 is another example system 318 for stapling sensors consistent with the present disclosure. System 318 may include processor 320. System 318 may further include a non-transitory computer readable medium 322 on which may be stored instructions, such as instructions 324, 326, 328, and 330. Although the following descriptions refer to a single processor and a single non-transitory computer readable medium, the descriptions may also apply to a system with multiple processors and multiple non-transitory computer readable mediums. In such examples, the instructions may be distributed (e.g., stored) across multiple non-transitory computer readable medium and the instructions may be distributed (e.g., executed by) across multiple processors.

Processor 320 may be a central processing unit (CPU), a semiconductor based microprocessor, and/or other hardware devices suitable for retrieval and execution of instructions stored in non-transitory computer readable medium 322. Processor 320 may fetch, decode, and execute instructions 324, 326, 328, 330, or a combination thereof. As an alternative or in addition to retrieving and executing instructions, processor 320 may include at least one electronic circuit that includes electronic components for performing the functionality of instructions 324, 326, 328, 330 or a combination thereof.

Non-transitory computer readable medium 322 may be electronic, magnetic, optical, or other physical storage device that stores executable instructions. Thus non-transitory computer readable medium 322 may be, for example, Random Access Memory (RAM), an Electrically-Erasable Programmable Read-Only Memory (EEPROM), a storage drive, an optical disc, and the like. Non-transitory computer readable medium 322 may be disposed within system 318, as shown in FIG. 3. In this example, the executable instructions may be "installed" on the system 318. Additionally and/or alternatively, non-transitory computer readable medium 322 may be a portable, external or remote storage medium, for example, that allows system 318 to download the instructions from the portable/external/remote storage medium. In this situation, the executable instructions may be part of an "installation package". As described herein, non-transitory computer readable medium 322 may be encoded with executable instructions for a stapling device.

Instructions 324 may include instructions executable to move a print job along a first axis of a finishing device. As described with respect to FIG. 1, a print job may move along a finishing device along a first axis towards a stapling device contained within the finishing device. Thus, instructions 324 may include instructions executable to determine a location of a stapling device and move the print job along a first axis such that the print job approaches the stapling device.

Instructions 326 may include instructions executable to determine that a sensor located on a stapling device contained within the finish device has been tripped by a first edge of the print job. As described with respect to FIGS. 1 and 2, the sensor may be tripped when the first edge of the print job interacts with the sensor. Said differently, instructions 326 may include instructions executable to determine that the print job moving about the first axis has interacted with the sensor.

Instructions 328 may include instructions executable to determine a location at which the sensor was tripped. In some examples, the location determined by instructions 328 may be a location along the first axis, or the axis along which the print job was moving when the sensor was determined to be tripped by instructions 326. Upon determination of the location at which the sensor was tripped by instructions 328, further instructions may be executable to move the print job an additional predetermined distance past the determined location at which the sensor was tripped. The predetermined distance may be a predetermined length from the location at which the sensor was determined to be triggered. In some examples, the print job may be moved the predetermined distance along the first axis. The predetermined distance may be a length defined within instructions, such as instructions 328, although examples are not so limited.

Instructions 330 may include instructions executable to move the stapling device along a second axis of the finishing device. As shown in FIG. 2, the second axis along which the stapling device moves may be perpendicular to the first axis along which the print job moved. In some examples, instructions 330 may be executable to move the stapling device along the second axis at the location along the first axis at which the sensor was tripped. That is, the stapling device may move along the second axis at the location determined by instructions 328. Instructions 330 may further include instructions executable to determine a direction perpendicular to the first axis in which to move the stapling device. That is, instructions 330 may include instructions executable to determine the second axis about which to move the stapling device.

Non-transitory computer readable medium 322 may further include instructions executable to determine that a sensor located on the stapling device has been re-tripped. As described with respect to FIG. 2, a sensor may be re-tripped when the condition that originally triggered the sensor is undone or removed. The sensor may be re-tripped when a second edge of the print job (shown in FIG. 2) reaches the sensor. Thus, the instructions executable to determine that a sensor located on the stapling device has been re-tripped may include instructions executable to determine that a second edge of the print job has been reached. In some examples, the location at which the sensor is re-tripped may depend on the characteristics of the print job. For example, a print job that is using A4 paper may have the sensor re-trip at a first point, while a print job that is using A3 paper may have the sensor re-trip at the second point. Instructions may further be executable to cause the stapling device to stop moving along the second axis. In some examples, the instructions executable to cause the stapling device to stop moving may be executed in response to a determination that the sensor located on the stapling device has been re-tripped. Said differently, the stapling device may stop moving upon a determination that the stapling device has reached a second edge of the print job.

Non-transitory computer readable medium 322 may further include instructions executable to cause the stapling device to staple the print job. The instructions to staple the print job may be executed in response to the determination that the stapling device has reached a second edge of the print job, and the instructions to stop moving the stapling device. Said differently, the instructions to staple the print job may be executed when the sensor on the stapling device has been re-tripped. This may result in the print job being stapled at, for example, a corner of the print job, although examples are not so limited. In some examples, the position at which the stapling device staples the print job may vary based on the size and/or type of the print job. For instance, as described previously, a sensor may re-trip at a first location when the print job uses A4 paper but may re-trip at a second location when the print job uses A3 paper. As a result, the location at which the staple is placed for the A4 print job may be different than the location at which the staple is placed for the A3 print job.

Non-transitory computer readable medium 322 may further include instructions executable to determine that the sensor has not been re-tripped. In some examples, the instructions may determine that the sensor has not been re-tripped if the sensor has not detected the second edge of the print job within a particular amount of time. For example, an amount of time for the stapling device to move from its initial position to the edge of the print job, such that the sensor may be re-tripped, may be known. If the sensor is not re-tripped in substantially the known amount of time, a determination may be made that the sensor has not been re-tripped. In some examples, the sensor may not be re-tripped due to an error with the print job. For instance, a print job may include multiple pages. If the pages of the print job are not stacked correctly (e.g., the pages are askew with respect to each other) the sensor may not re-trip within the expected amount of time.

In response to a determination that the sensor has not been re-tripped, non-transitory computer readable medium 322 may further include instructions executable to stop moving the stapling device. Said differently, the stapling device may stop moving when a determination is made that the sensor has not been re-tripped within an expected amount of time. Moreover, instructions may be executable to cause the stapling device to refrain from stapling or fastening the print job. Instead, the print job may be discharged from the finishing device and presented to a user. This may allow a user to correct the error in the print job that led to the sensor not being re-tripped (e.g., aligning the pages of the print job).

Figure 4:
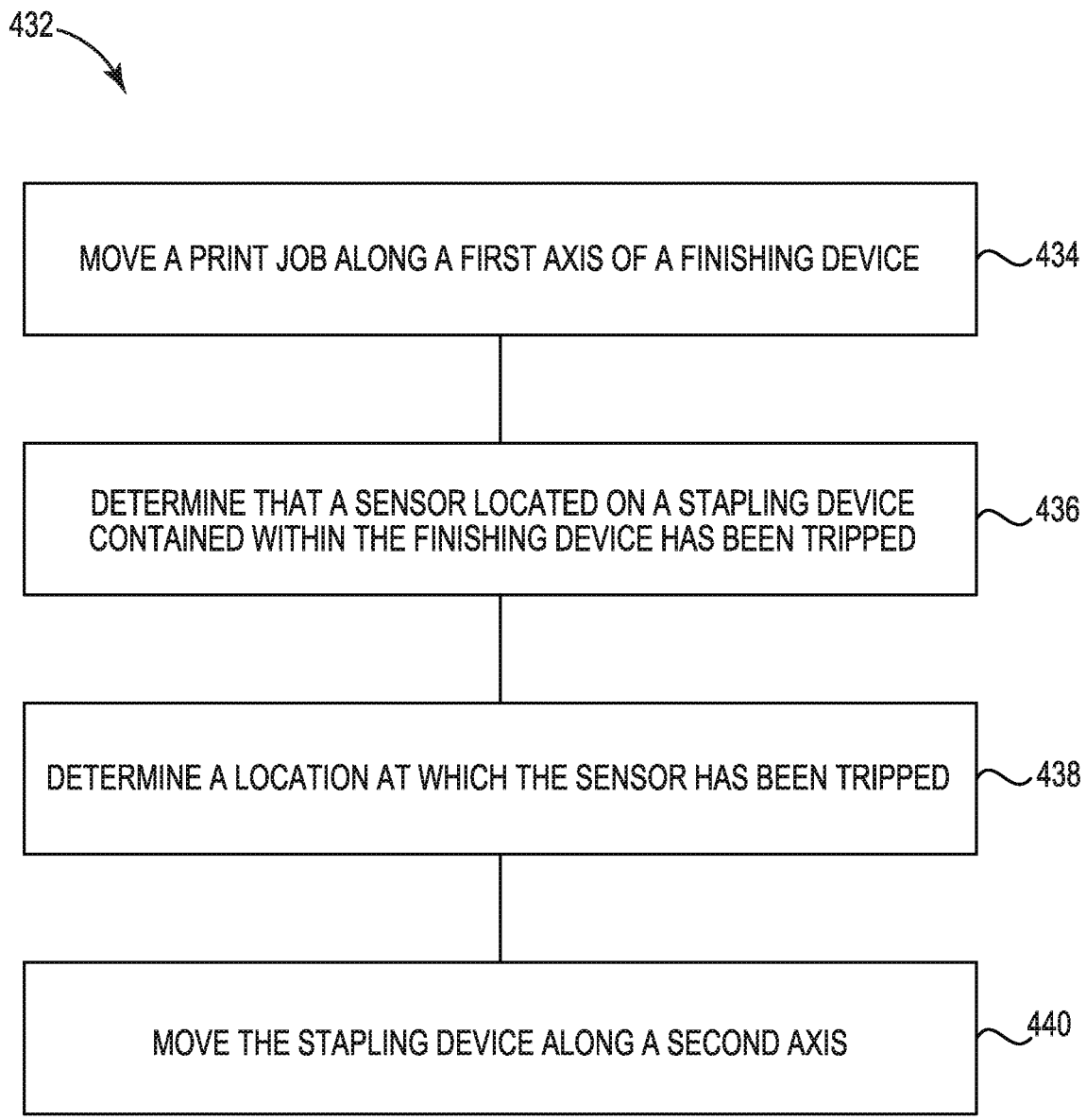
FIG. 4 is an example method for stapling sensors consistent with the present disclosure.

FIG. 4 is an example method 432 for stapling sensors consistent with the present disclosure. At 434, method 432 may include moving a print job along a first axis of a finishing device. The print job may be moved along the first axis of the finishing device by the finishing device itself. That is, moving a print job along a first axis of a finishing device at 434 may include moving the print job along the first axis of the finishing device by the finishing device itself by, for example, a roller or a motor, although examples are not so limited.

At 436, method 432 may include determining that a sensor on a stapling device has been tripped. As illustrated in FIGS. 1 and 2, the stapling device may be contained within the finishing device. In some examples, the sensor on the stapling device may be tripped by a first edge of the print job. The first edge of the print job may be the leading edge of the print job; that is, the first edge of the print job may be the edge approaching the stapling device as the print job moves along the first axis at 434.

At 438, method 432 may include determining a location at which the sensor has been tripped. Determining a location at which the sensor has been tripped at 438 may occur in response to the determination that the sensor has been tripped made at 436. In some examples, determining the location at which the sensor has been tripped at 438 may include determining a location along the first axis at which the sensor was tripped.

At 440, method 432 may include moving the stapling device along a second axis of the finishing device. In some examples, the second axis of the finishing device may be substantially perpendicular to the first axis of the finishing device. Moving the stapling device along a second axis of the finishing device at 440 may include moving the stapling device about the second axis at the location at which the sensor was tripped. That is, moving the stapling device about the second axis at 440 may include moving the stapling device about the second axis at the location determined at 438.

In some examples, method 432 may include moving the stapling device a first predetermined distance past the location determined at 438. Said differently, method 432 may include moving the stapling device a particular distance past the location at which the sensor is determined to have been tripped. In some examples, the first predetermined distance may be a predetermined distance along the first axis; thus, the stapling device may move the predetermined distance along the first axis. Upon moving the first predetermined distance, the stapling device may move about the second axis at 440.

In some examples, moving the stapling device along the second axis at 440 may include moving the stapling device along the second axis to a second predetermined position. In some examples, the second predetermined position may be a predetermined position along the second axis, and may be located a predefined distance from a second edge of the print job. Upon moving the stapling device to the second predetermined position, method 432 may further include continuing to move the stapling device along the second axis. In some examples, continuing to move the stapling device along the second axis may include moving the stapling device past the second predetermined position.

Method 432 may further include determining that the sensor located on the stapling device has been re-tripped. As described previously, the sensor may be re-tripped when the condition that originally caused the sensor to be tripped is removed or undone. In some examples, determining that the sensor located on the stapling device has been re-tripped may include determining that the stapling device has moved past a second edge of the print job. That is, determining that the sensor has been re-tripped may include determining that a second edge of the print job re-tripped the sensor. In some examples, the second edge of the print job may be substantially perpendicular to the first edge of the print job. In response to determining that the sensor located on the stapling device has been re-tripped, method 444 may further include stopping the movement of the stapling device along the second axis. That is, upon determining that the sensor has been re-tripped, the stapling device may stop moving. In some examples, the stapling device may stop moving at a location into which a fastener, such as a staple, is to be inserted.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A system, comprising:
a finishing device to receive a print job, wherein the print job moves about a first axis of the finishing device;
a stapling device contained within the finishing device, the stapling device to move about a second axis of the finishing device, wherein the second axis is perpendicular to the first axis;
a sensor located on the stapling device to identify a first edge of the print job when the sensor is tripped and to identify a second edge of the print job when the sensor is re-tripped, wherein the first edge of the print job is a leading edge of the print job as the print job moves about the first axis; and
a motor to move the stapling device about the second axis in response to the sensor being tripped and stop the stapling device in response to the sensor being re-tripped.

2. The system of claim 1, wherein the second edge is perpendicular to the first edge of the print job.

3. The system of claim 1, wherein:
the print job moves about the first axis of the finishing device to the sensor; and
an edge of the print job triggers the sensor.

4. The system of claim 1, wherein:
the stapling device moves about the second axis to a predefined position with respect to the print job; and
the stapling device moves past the predefined position about the second axis.

5. The system of claim 4, wherein the stapling device moves past the predefined position about the second axis to a point at which the sensor is re-tripped.

6. A non-transitory computer readable medium containing instructions executable by a processor to:
move a print job along a first axis of a finishing device;
determine that a sensor located on a stapling device contained within the finishing device was tripped;
determine a location along the first axis at which the sensor was tripped;
move the stapling device along a second axis of the finishing device, wherein the stapling device moves along the second axis at the location along the first axis at which the sensor was tripped;
determine that the sensor located on the stapling device has been re-tripped; and
stop moving the stapling device in response to the determination that the sensor located on the stapling device has been re-tripped.

7. The non-transitory computer readable medium of claim 6, wherein the instructions to move the stapling device along a second axis include instructions executable to determine a direction perpendicular to the first axis in which to move the stapling device.

8. The non-transitory computer readable medium of claim 6, wherein the sensor is tripped by a first edge of the print job and the sensor is re-tripped by a second edge of the print job.

9. The non-transitory computer readable medium of claim 8, further comprising instructions executable by the processor to cause the stapling device to staple the print job.

10. The non-transitory computer readable medium of claim 6, further comprising instructions executable by the processor to:
determine that the sensor has not been re-tripped;
stop moving the stapling device in response to the determination that the sensor has not been re-tripped; and
refrain from stapling the print job.

11. A method, comprising:
moving a print job along a first axis of a finishing device;
determining that a sensor located on a stapling device contained within the finishing device has been tripped by a first edge of the print job;
determining a location at which the sensor has been tripped; and
moving the stapling device along a second axis, wherein:
the second axis is perpendicular to the first axis;
the stapling device moves about the second axis at the location at which the sensor was tripped;
determining that the sensor has been re-tripped; and
in response, stopping the movement of the stapling device along the second axis.

12. The method of claim 11, wherein the first edge of the print job meets a second edge of the print job at a corner of the print job.

13. The method of claim 11, wherein determining that the sensor has been re-tripped includes determining that the stapling device has moved past a second edge of the print job, wherein the second edge of the print job is perpendicular to the first edge of the print job.

14. The method of claim 11, further comprising moving the stapling device a first predetermined distance past the determined location in response to determining the location at which the sensor has been tripped.

15. The method of claim 11, wherein moving the stapling device along the second axis comprises:
moving the stapling device along the second axis to a second predetermined position along the second axis, wherein the second predetermined position is located a predefined distance from the second edge of the print job; and
continuing to move the stapling device past the second predetermined position along the second axis.

* * * * *